SUCTION LOAD-HANDLING APPARATUS
Filed Feb. 3, 1966 2 Sheets-Sheet 1
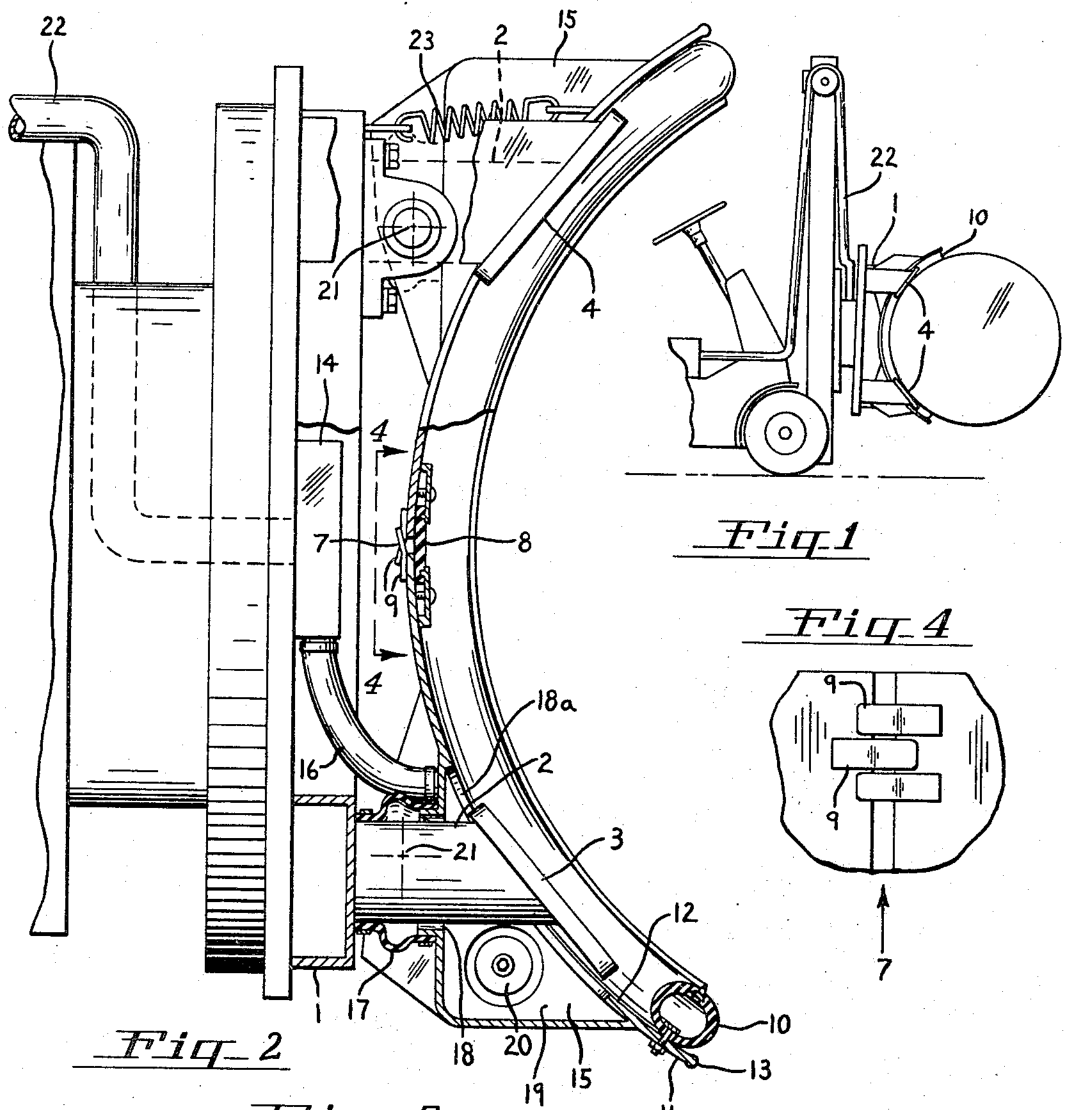
Fig. 1
Fig. 4
Fig. 2
Fig. 5
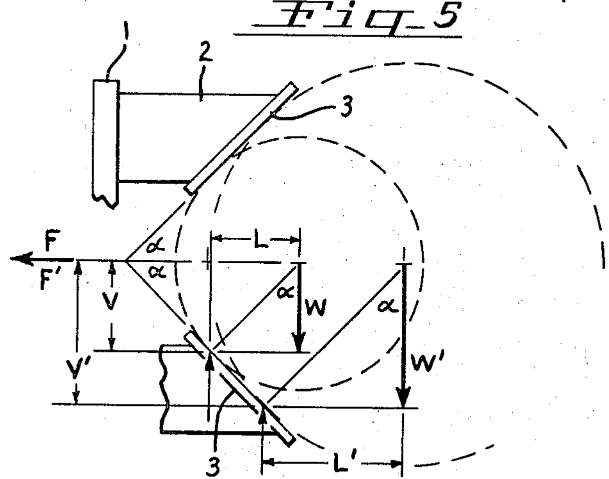
DONALD A. HARRIS
JOHN E. OLSON
INVENTORS
BY BUCKHORN, BLORE
KLARQUIST & SPARKMAN
Attorneys SUCTION LOAD-HANDLING APPARATUS
Filed Feb. 3, 1966 2 Sheets-Sheet 2
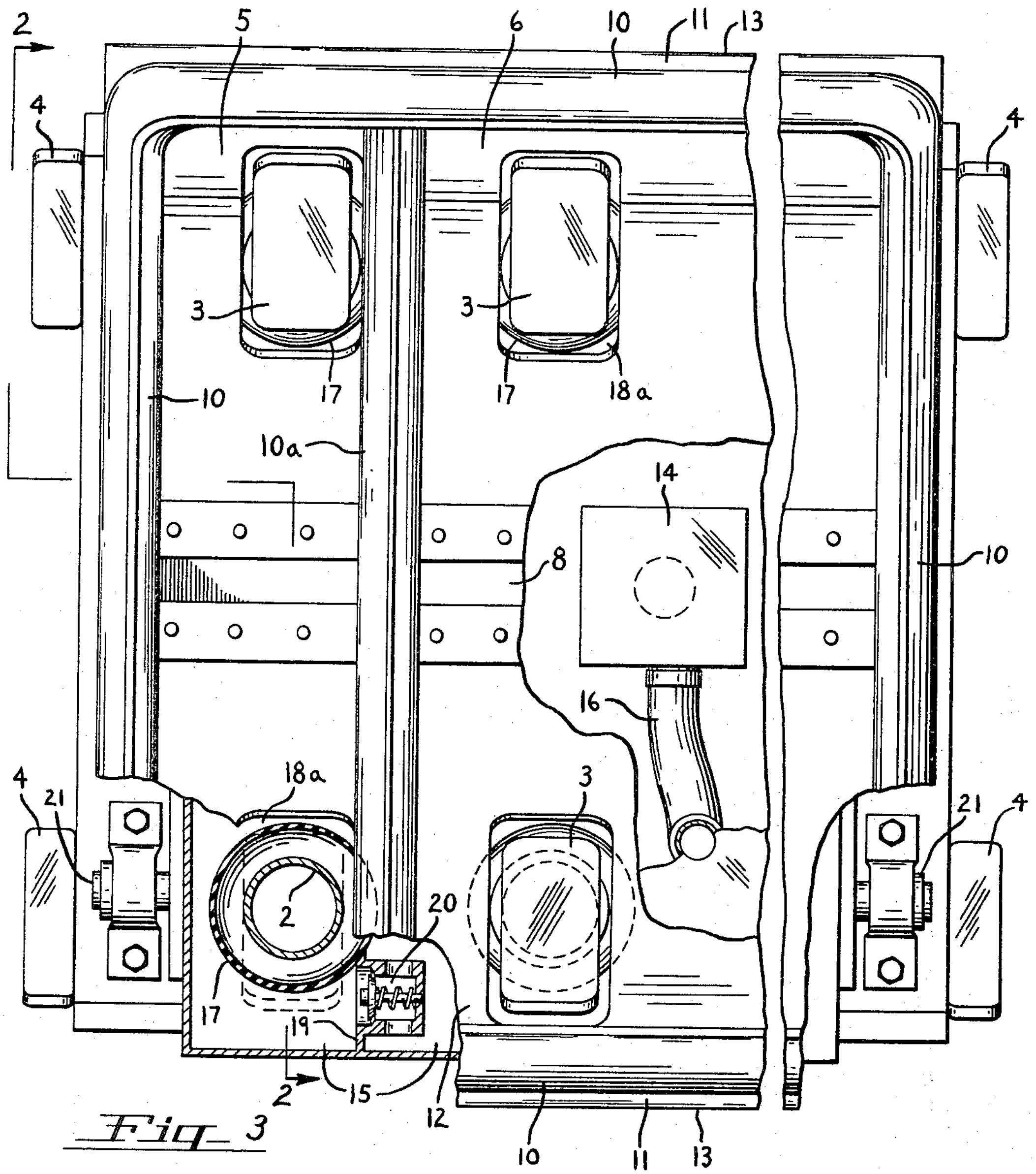
DONALD A. HARRIS
JOHN E. OLSON
INVENTORS
BY
BUCKHORN, BLORE, KLARQUIST & SPARKMAN
Attorneys United States Patent Office 3,376,061
Patented Apr. 2, 1968

3,376,061

SUCTION LOAD-HANDLING APPARATUS

Donald A. Harris, Vancouver, Wash., and John E. Olson, Portland, Oreg., assignors to Hyster Company, Portland, Oreg., a corporation of Nevada Filed Feb. 3, 1966, Ser. No. 524,908
20 Claims. (Cl. 294—64)

ABSTRACT OF THE DISCLOSURE

The present application discloses a suction cup for handling cylindrical loads of different diameters mounted on a rotatable load apron of a lift truck. The cup includes a pair of cylindrically curved plate sections hinged together along a straight side edge of each for articulation relative to the load apron about a longitudinal hinge axis of the cup. An endless tubular elastomer sealing lip with a removable load-engaging portion extends forwardly from peripheral edges of the plate sections. Pairs of load-engaging pads are positioned within the cup on opposite sides of the hinge axis. These pairs of pads are mounted independently of the plate sections by posts which extend through the curved plate sections to connect the pads directly to the load apron. The pairs of pads are mounted at a constant inclination toward one another to define wedging surfaces. Thus, a load to be lifted is engaged only by the pads and sealing lip and supported primarily by the frame-mounted pads rather than by the articulated plate sections so as to provide an unusually stable load support. Moreover, because of the constant inclination of the pad surfaces with respect to the horizontal when the plates are disposed in a position with one pad directly above the other, the vacuum force required to lift a cylindrical load with its longitudinal axis in a horizontal plane varies only with the weight of the load and not its diameter.

The present invention relates to an improved suction load-handling apparatus for mounting on an industrial lift truck or other mobile load-handling apparatus and more particularly, to an improved suction cup construction for handling cylindrical loads, and especially heavy paper rolls, of different diameters disposed either horizontally or vertically.

The principal objects of the invention are:

To handle paper rolls and other cylindrical loads of varying width and diameter;

To transfer the major supporting forces directly to the fixed frame of the device rather than through the articulated cup sections as in prior art;

To obtain rigidity of the supported load;

To permit maximum lateral spread of rigid supporting faces without limiting the differential pressure area;

To permit optimum wedging action between supporting faces and the load so as to develop a surface pressure between the load and the friction surfaces considerably greater than the total force developed by differential air pressures to the end that maximum friction to be developed between the load and the supporting surfaces;

To maintain a constant wedging action irrespective of the size of the cylindrical object being handled;

To provide a flexible sealing lip with replaceable wearing edge in a position where it is protected from mechanical damage when approaching a horizontally disposed roll;

To provide an articulated vacuum cup which, in relaxed position, will be of greater radius than that of the load to the end that, when embracing a load, the first contact between the cup and the load is at the center of the cup in order to minimize abrasive action encountered in the prior art while the cup is adjusting its radius to that of the load;

To provide a vacuum load embracing mechanism for horizontal cylindrical loads that automatically adjusts its resisting moment to compensate for changes in load moment that result from changes in diameter of the load;

To provide an articulated vacuum cup with a center hinge capable of lateral extension as well as flexure, but capable of resisting axial displacement.

The above and other objects and advantages of the invention will become more apparent from the following description which proceeds with reference to the accompanying drawings wherein:

FIG. 1 is a side elevational view of a front end portion of a lift truck and an attached suction load-handling apparatus in accordance with the invention;

FIG. 2 is an enlarged side view, partly in section, of the suction load-handling apparatus of FIG. 1 taken approximately along the line 2—2 of FIG. 3;

FIG. 3 is a front elevational view of the suction head of FIG. 2 with parts broken away to reveal the internal construction thereof;

FIG. 4 is a view taken along the line 4—4 of FIG. 2 showing the details of the hinge joint of the suction head; and FIG. 5 is a force diagram illustrating certain advantages of handling horizontal cylindrical objects with a suction cup construction in accordance with the invention.

The device is attached to the carriage of a lift truck usually, but not necessarily, in conjunction with a rotator as shown in FIG. 1 and disclosed in Olson Patent No. 3,207,348. Vacuum is supplied through a hose 22 from a vacuum source on the body of the truck, also as disclosed in Patent 3,207,348. Subject invention is not concerned with the lift truck, the carriage, the rotator, or the vacuum source.

Attached to and integral with base frame 1, we provide two or more cylindrical posts 2, each equipped with a load bearing pad 3. Pads 3 on each side of the center of the device are sloped toward the center, each at the same angle of approximately 45°.

It will be noted from FIG. 3 that we provide a pair of opposed pads 3 within each vacuum cup and, at option, we also provide a pair of similar pads 4 outside the cups, each in alignment and in the same plane as the corresponding pads 3. Thus, all pads on each side of the truck will contact the cylindrical load along the same element of the cylinder.

All pads 3 and 4 are preferably provided with a surface producing a high coefficient friction of use particularly when the axis of the load is vertical.

Surrounding pads 3, we provide one or more vacuum cups as, for example, cups 5 and 6 as shown in FIG. 3. The cups are preferably hinged in the center as at 7. In the drawings, cups 5 and 6 have a common backing plate 12 each side of the hinge but this is not a requirement of the invention.

Hinge 7 is sealed against the entrance of air by elastomer strip 8 and is restrained against excessive misalignment by interlocking fingers 9. Strip 8 is elastic enough to allow expansion and contraction of the hinge as well as bending and, thus, the two halves of the cups are free to rotate about pivotal mountings 21 which will be described later.

Surrounding each cup there are sealing members 10 and 10-*a*, the latter being a seal used mutually by cups 5 and 6. The seals are similar in many details to those disclosed in prior Patent 3,227,482, but, in order to protect them from physical damage through contact with the floor when picking up horizontal loads, we provide an improved configuration shown in detail in FIG. 2, which will permit the seal to be mounted inside the protruding edge 11 of backing plate 12. This edge is reinforced by a steel bar 13 which is welded to it. Another advantage of our improved seal is that it provides for manufacture by an economical extrusion process.

At the center of the vacuum cup assembly there is provided a manifold 14 which is connected to the source of vacuum in a manner disclosed in prior Patent 3,207,348.

Attached to the rear face of each backing plate 12 is a prism shaped chamber 15, one of which is connected to manifold 14 by hose 16. Suitable openings 18 and 18–*a* in the rear faces of chambers 15 and in backing plates 12, respectively, provide for the passage therethrough of posts 2 and pads 3, allowing ample clearance. Sealed to the openings 18 are annular elastomer bellows 17 which are likewise sealed at their opposite ends to base member 1. Thus, all air which is allowed to enter chambers 15 must come through the openings 18–*a* which are within the confines of the vacuum cups. To prevent air from entering openings 18–*a* when a short roll is being handled and vacuum cup 5 is not covered, we provide partitions 19 in the prism shaped chambers 15, and valve 20 in the one to which hose 16 is connected. Valve 20 has been wholly disclosed in prior Patent 3,147,872.

From the above description, it is apparent that vacuum cups 5 and 6 are free to articulate about their pivoted mountings 21 without being inhibited by stationary posts 2 and their associated pads 3 and without allowing the entrance of air except through openings 18–*a* where such entrance is desired. At the same time, it is noted that the seals between the stationary posts and the movable vacuum cups sections are not dependent on closely fitting movable contacts or seals subject to wear.

The articulated halves of the vacuum cup assembly are mounted for pivotal movement about bearings 21, so that the cups can adjust themselves in a wide range of diameters in a manner similar to that disclosed in the prior patent but differing in that the subject arrangement does not require slots in any of the mountings. Instead of slots, we provide stretchable hinge strip 8 and overlapping fingers 9 which will allow lateral movement between the two halves of the cup.

When approaching a roll of paper or any other cylindrical load, it is desirable to have the first contact with the load occur at the center of the articulated cups rather than at the edges. This is so because, if first contact is made at the edges, there is considerable sliding of the sealing lips over the load which reduces the life of the former. In order to assure that initial contact occurs at the center, we provide springs 22 which rotate the leaves of the cups outwardly about bearings 21 with the result that hinge 7 will project outwardly and will be the first part of the cup to contact.

When it is desired to pick up a cylindrical load such as a roll of paper standing on end, the truck advances toward the load until the hinge 7 contacts the cylinder, after which further advance of the truck rotates the leaves of the vacuum cups inwardly, until light contact is made by the seals all around the periphery of the cups. After the seal contacts the load, the cups are evacuated by opening a valve in hose 22, not shown. If the load is a short one and does not extend sufficiently to cover cup 5, valve 20 will close and prevent the inrush of air through open cup 5.

When vacuum is drawn inside the cups, the external, ambient pressure acting on the load, and the back of the vacuum cups, respectively, will draw the two together with the result that either the load or the truck will move until the load is pressed tightly against bearing pads 3 and 4. After the load contacts the pads, there is a great pressure force acting on the entire rear face 12 of the vacuum cups. The reaction to this force is provided by pivot bearings 21, acting through the rigid structure of frame 1 and back to the pads. The opposite pressure force acting on the load reacts against the friction pads with the result that the load and the entire attachment can be handled as a single, very rigid unit.

It is significant to note that in this arrangement the only contact between the load and the device, except for the flexible sealing rim, lies along the elements of the cylinder which are tangent to the fixed angular faces of pads 3 and 4. These contact points are predictable and constant for given diameter of load because the pads are rigidly held in a fixed relationship with each other. This presents an advantage over the prior art where the contact points are at some unpredictable and varying location within pivoted vacuum cups.

The only force that prevents a vertical roll from sliding off a vacuum attachment of this type is that force developed by friction along the lines (or areas) of contact between the load and the load-bearing pads. This force is equal to the so-called vacuum force times the coefficient of friction between the pads and the load. The coefficient of friction is seldom equal to as much as unity so it is, therefore, necessary to develop a contact force in excess of the weight of the load. The vacuum force on which the contact force depends is obviously limited to a value considerably less than the atmospheric pressure acting on the differential area, so it is advisable to supplement this. The vacuum force is supplemented in our arrangement by wedging action which results from the vacuum force pushing the load between the angular faces of the contact pads. As this supplemental force is so vital to successful operation, we keep it constant so that it never falls below the design value as rolls of different diameters are embraced.

Another factor involved in handling vertical loads is the moment of the load about the lowermost contact between the load and the pads. This moment develops because the center of gravity of the load is at the center of the cylinder, remote from the contact point. It is advantageous to have the lower contact as far below the resultant of the vacuum force as possible, so we provide pads 4 outside the limits of the vacuum cups. Two pairs of pads 4 are provided as shown in FIG. 3 when the attachment is mounted on a rotator and, therefore, must handle a load wtih either end of the attachment up. Pads 4 also serve to protect the curved portions of sealing rim 10 from contact with the ground, the same as projection 11 referred to elsewhere protects the straight portions of the rim. In certain instances where only long loads will be handled, interior pads would not be needed, as the external pads 4 would prevent engagement of such loads with the base member of the cup.

It should also be noted that, as opposed to the prior art, the lifting forces, after the load is removed from the ground by the device, are not transmitted through the vacuum cup structure and its pivotal connections, but rather through the integral frame-post-pad assemblies. This provision saves considerable cost because it permits cups and bearings to be lighter than in prior art devices.

The discussion above has been directed to the handling of a cylindrical load with its axis vertical. However subject attachments are frequently mounted on a rotating apron and must, therefore, handle loads with axis horizontal as well as vertical.

Many conditions in handling a horizontal load are different from the conditions in handling a vertical load, as will be indicated by reference to FIG. 5. The contact points between the pads and the load will necessarily fall at the points of tangency which, because of the rigidity of the pad-frame construction will be constant for any given diameter of roll. Rolls of two different diameters are shown in the diagram and it is apparent that, as the diameter of the load increases, the contact points become farther apart. As the diameter of the roll increases, similarly, the moment arm of the load L increases to L'. It can be mathematically demonstrated that the resisting moment of the device also increases in the same ratio as moment arm V increases to V'.

It can also be mathematically demonstrated from FIG. 5 that the required vacuum force F will change with the angle $\alpha$. The horizontal component of the vacuum force of the cup acts along the arrow marked F. This force, times moment arm V or V′ produces the resisting moment of the attachment. Opposing this is the load moment which is the product of weight W or W′ and its moment arm L or L′, respectively. To be in equilibrium, therefore, $LW$ must$=FV$ and $W'L'=F'V'$. These may also be expressed $F=W(L/V)$ and $F'=W'(L'/V')$. But $L/V$ and $L'/V'$ each$=\tan\alpha$ and, therefore, $L/V=L'/V'$. Thus, $F=W\tan\alpha$ and $F'=W'\tan\alpha$.

Accordingly, the required vacuum force F will vary with tthe pad angle $\alpha$, so it is advisable to keep this angle constant rather than let it vary with load diameter as in the prior art.

In prior art attachments, where the contact points are at some indeterminate location within pivoted cups, changes in angle $\alpha$ occur as load diameter changes. They are beyond the control of the designer, and are relatively unpredictable. In our device, however, the designer can establish a fixed optimum value for angle $\alpha$ and rest assured that unforeseen conditions will not occur.

It will be apparent from the foregoing description of a preferred embodiment of the invention that the same permits of modification in arrangement and detail. We claim as our invention all such modifications as come within the true spirit and scope of the appended claims.

We claim:

1. A suction load-handling apparatus comprising:
a frame,
a suction head mounted on said frame,
said suction head including a body member mounted for movement relative to said frame and lip means for sealingly engaging a load,
and load-engaging means rigidly carried by said frame and extending through said body member and terminating in a load-engaging surface within the interior of said suction head, whereby said head can be moved to accommodate loads of different sizes without moving said load-engaging means.

2. A suction load-handling apparatus comprising:
a frame,
a suction head forwardly of said frame,
said suction head including a plate-like body member and an endless sealing lip extending forwardly from said body member to form a cup for engaging a load,
means for creating a vacuum within said cup when said lip is engaging a load,
a load-engaging pad associated with said cup including means rigidly mounting said pad on said frame,
and means mounting said body member on said frame and permitting movement of said member relative to said frame for accommodating loads of different sizes while said load-engaging pad remains stationary relative to said frame,
said pad being so disposed relative to said cup as to prevent contact between the load and said body member.

3. Apparatus according to claim 2 wherein said body member comprises a pair of rigid sections hinged together for movement about a hinge axis,
and wherein there are a pair of said load-engaging pads one on either side of said axis.

4. Apparatus according to claim 3 wherein the load-engaging surfaces of said pads are inclined inwardly toward said hinge axis.

5. Apparatus according to claim 2 wherein there are a pair of said pads one on each of laterally opposite sides of said body member,
each of said pads including a substantially planar load-engaging surface,
the load-engaging surfaces of said pads being inclined inwardly toward one another so as to define wedging surfaces.

6. Apparatus according to claim 2 wherein said plate-like body member is cylindrically curved to accommodate cylindrical loads.

7. Apparatus according to claim 2 wherein said plate-like body member comprises a pair of cylindrically curved sections hinged together for movement about a hinge axis parallel to the axes of curvature of said sections,
and a pair of said load-engaging pads within said cup one on each of the opposite sides of said hinge axis,
the load-engaging surfaces of said pads being inclined inwardly toward said hinge axis.

8. Apparatus according to claim 3 including hinge means hinging together said rigid members,
said hinge means including means permitting lateral separation of said rigid sections and means limiting the relative langitudinal displacement of said rigid sections.

9. Apparatus according to claim 3 including hinge means for hinging said rigid sections for movement about said hinge axis,
said hinge means comprising an elastomer strip attached to both said sections and sealing the joint between said sections against the passage of air therethrough.

10. Apparatus according to claim 2 wherein said endless sealing lip comprises a flexible tubular member carried by said body member and a load-engaging elastomer sealing strip removably mounted on said tubular member.

11. Apparatus according to claim 2 wherein said pad is within said cup and extends through an opening in said body member.

12. A suction cup according to claim 10 wherein said body member comprises two cylindrically curved sections hinged together for articulation about a hinge axis parallel to the axes of curvature of said sections.

13. Apparatus according to claim 10 including means for positioning said cup for picking up a horizontally disposed load,
said body member extending beneath said tubular member when said cup is positioned for picking up said load so that said body member protects said tubular member from engagement with objects beneath said cup when approaching said load.

14. Apparatus according to claim 12 including means for rotating said suction cup for picking up both horizontally disposed and vertically disposed cylindrical loads,
said body member extending beneath said tubular sealing member when said suction head is positioned for picking up a horizontal load,
whereby said body member protects said sealing member from damage when said cup approaches a horizontally disposed load.

15. A suction cup comprising:
a plate-like body member,
an endless sealing lip carried by said body member and forming a cup,
said body member including a pair of rigid sections,
hinge means joining together said sections so that said cup can articulate to accommodate loads of different sizes,
said hinge means comprising an elastomer strip secured to both said sections and sealing the joint between said sections against the passage of air therethrough,
and means restricting the displacement of said sections relative to each other longitudinally of the joint between said sections but permitting the lateral separation of said sections.

16. A vacuum cup according to claim 15 wherein said means preventing longitudinal displacement of said sections comprises a plurality of interlocking finger means, some of said finger means being secured to one of said sections and extending across the hinge joint and interlocking with others of said finger means secured to the other said section.

17. Apparatus according to claim 3 including resilient means urging opposed peripheral edge portions of said rigid section on opposite sides of said hinge axis rearwardly relative to said hinge axis so that when said cup approaches a load a central portion of said cup will first engage said load before said peripheral edge portions so as to minimize wear on the sealing lip along said edge portions.

18. Apparatus according to claim 7 including resilient means normally urging opposed peripheral edge portions of said curved sections on opposite sides of said hinge axis rearwardly toward said frame so that in approaching a load a portion of said suction head inwardly of said edge portions will engage said load before the engagement of said edge portions therewith, the strength of said resilient means being such that continued approach of said head to said load after the initial engagement of said head and load will cause said edge portions to move forwardly until the sealing lip along said edge portions engages said load.

19. Apparatus according to claim 3 including means on opposite sides of said hinge axis and rearwardly of said body member pivotally mounting each said rigid section on said frame for movement about pivot axes parallel to said hinge axis, spring means laterally outwardly of said pivot axes relative to said hinge axis normally urging the portions of said rigid sections outside said pivot axes rearwardly toward said frame, and elastomer hinge means hinging said rigid sections together for articulation about said hinge axis and permitting relative separating movement of said sections so that said sections can swing about said pivot axes.

20. A suction load-handling apparatus comprising:

a frame, a suction cup positioned on said frame and adapted for picking up horizontally disposed cylindrical loads, means connecting the interior of said cup to a source of vacuum on said frame, and a pair of load-engaging pads within said cup, said pads being positioned on opposite sides of a horizontal median plane of said cup and being inclined inwardly toward one another and toward said plane to define a pair of load-engaging wedging surfaces, said pads and the vacuum force required to lift a cylindrical load with its longitudinal axis in a horizontal plane bearing the relationship $$F=W \tan \alpha$$

where F is the horizontal component of vacuum force required to lift a given load, W is the weight of said load, and $\alpha$ is the angle of inclination of said wedging surfaces to said horizontal median plane, said cup being articulated to accommodate loads of different sizes, the angle $\alpha$ of each said wedging surface being constant relative to said horizontal median plane in all positions of articulation of said cup so that the vacuum force required to lift a horizontal cylindrical load varies only with the weight of the load and not with its diameter.

References Cited

UNITED STATES PATENTS

| | | | |
|---|---|---|---|
| 3,219,379 | 11/1965 | Ames | 294—64 |
| 3,227,482 | 1/1966 | Harris | 294—64 |
| 3,272,549 | 9/1966 | Nisula | 294—64 |

GERALD M. FORLENZA, *Primary Examiner.*

G. F. ABRAHAM, *Assistant Examiner.*